L. D. HART.
SILO AND ENSILAGE FEEDING STRUCTURE.
APPLICATION FILED MAY 8, 1919.
1,375,961.
Patented Apr. 26, 1921.
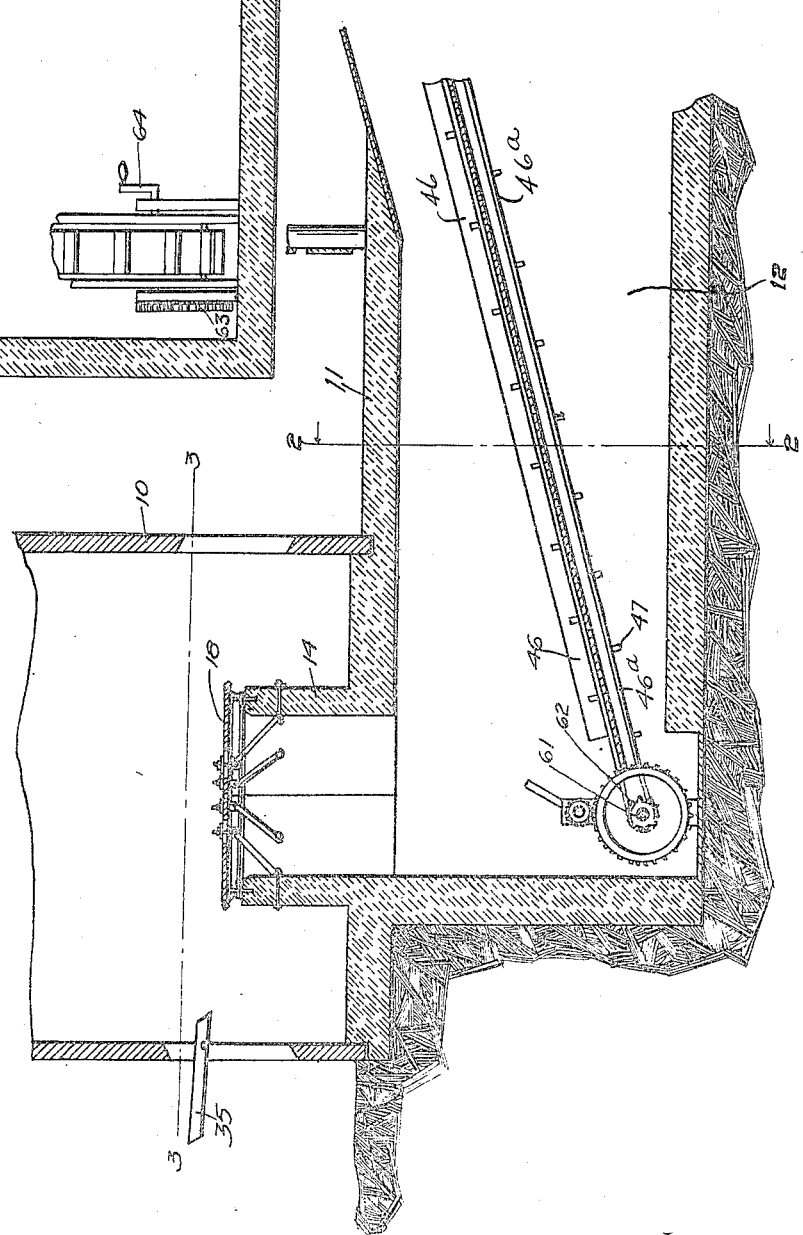

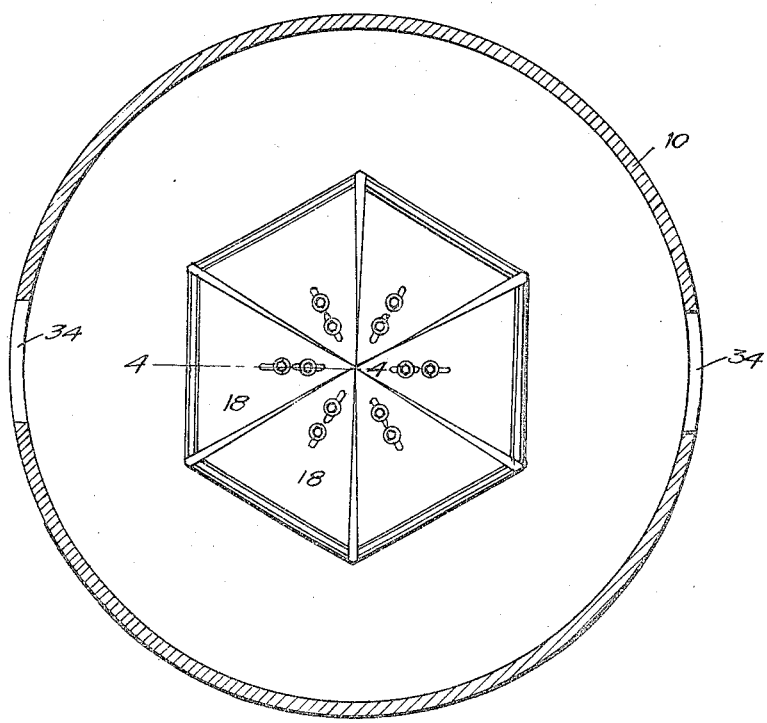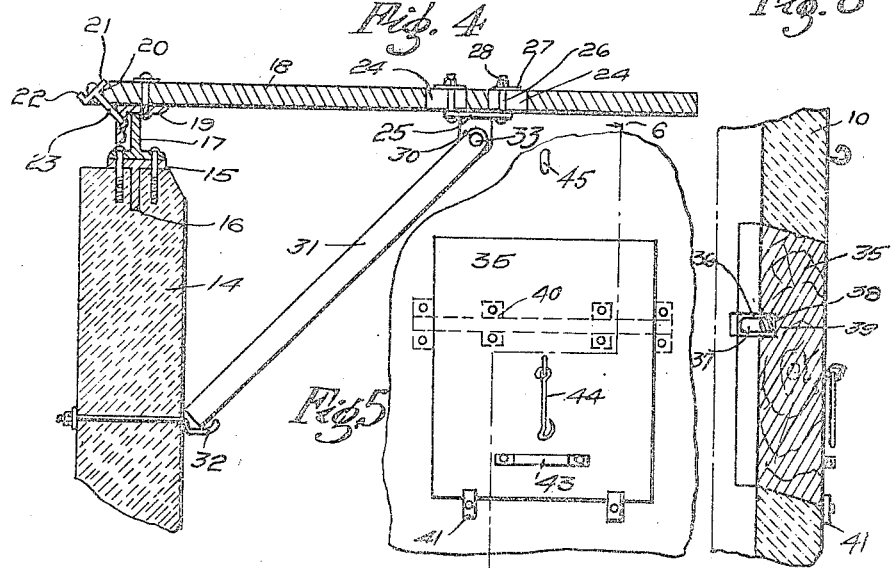

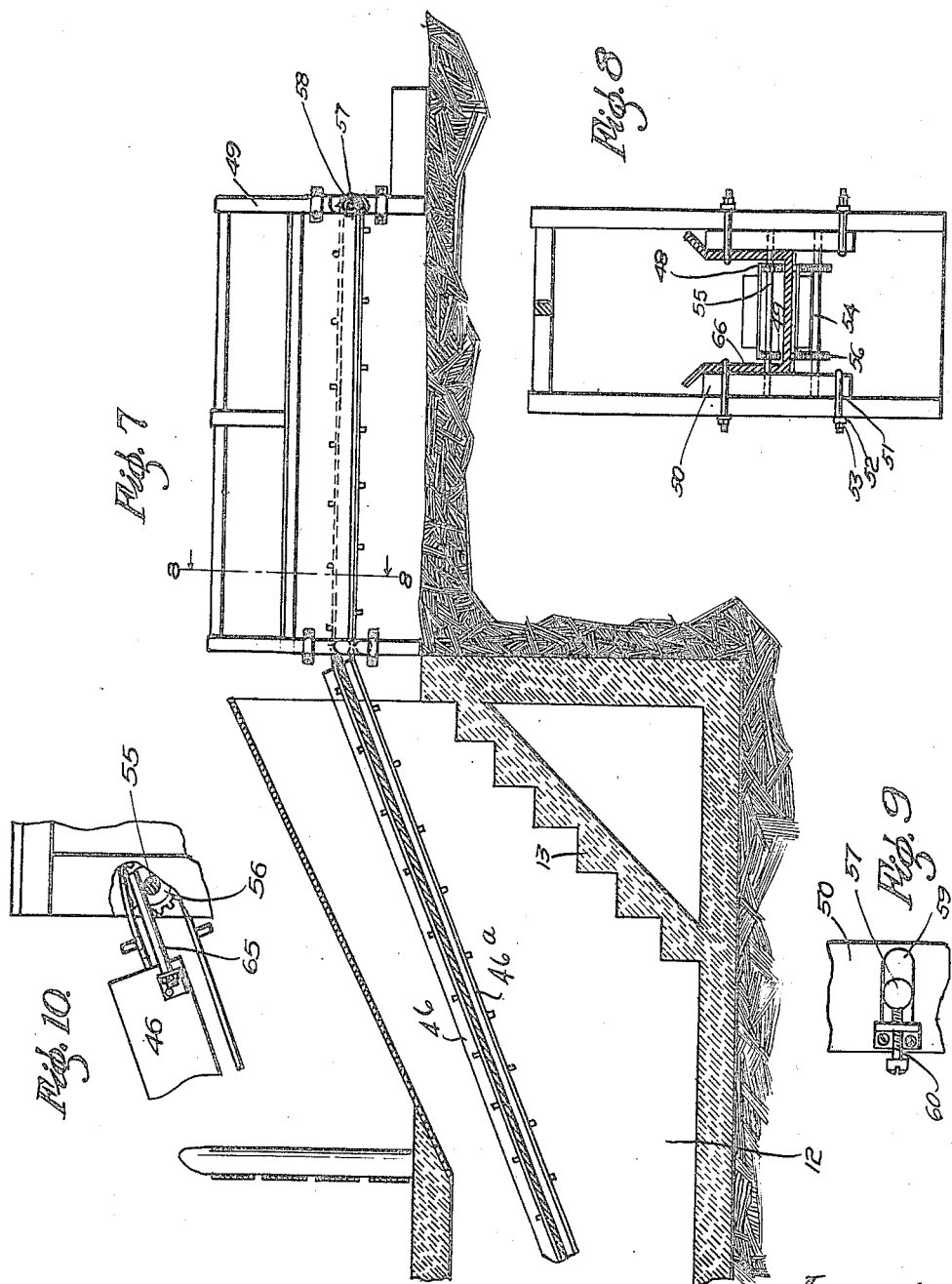

UNITED STATES PATENT OFFICE.

LOREN D. HART, OF DICKENS, IOWA.

SILO AND ENSILAGE-FEEDING STRUCTURE.

1,375,961.  Specification of Letters Patent.  Patented Apr. 26, 1921.

Application filed May 8, 1919. Serial No. 295,737.

*To all whom it may concern:*

Be it known that I, LOREN D. HART, a citizen of the United States and a resident of Dickens, in the county of Clay and State of Iowa, have invented a certain new and useful Silo and Ensilage-Feeding Structure, of which the following is a specification.

The object of my invention is to provide a silo and ensilage feeding structure of simple, durable and inexpensive construction.

More particularly it is my object to provide such a device including an ordinary silo wall provided with a series of openings near the bottom thereof and having door members which may be opened for permitting access to feeding animals, and through which openings ensilage may be taken out if desired.

A further object is to provide such a silo preferably having a central upwardly extending, hollow cylindrical member at its lower end, which member may be plural sided or otherwise as desired.

Still a further object is to provide in such a structure a plurality of cover sections for said central member, pivotally supported at their upper ends, and to provide means for supporting said cover sections in raised position, which means are readily adjustable for permitting the inner ends of the cover section to drop downwardly.

Still a further object is to provide in such a structure cover sections of the kind mentioned, and having at their outer edges portions or means for engaging ensilage and slightly disturbing it when the cover sections are dropped down for causing the ensilage to drop downwardly.

Still a further object is to provide in connection with such a silo structure a passage below the silo through which ensilage dropped downwardly from the center of the silo may be removed.

An additional object of my invention is to provide an endless carrier adapted to receive ensilage dropped from the central part of the silo and convey such ensilage into a feeding yard and serve as a feeding trough for stock.

Another object is to provide in such a silo near the lower portion thereof, swinging door members so arranged that when the door members are opened their inner ends project into the silo, forming means for preventing the ensilage from dropping down.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a vertical, sectional view through a silo structure embodying my invention.

Fig. 2 shows a transverse, sectional view taken on the line 2—2 of Fig. 2.

Fig. 3 shows a horizontal, sectional view taken on the line 3—3 of Fig. 1, the doors being omitted.

Fig. 4 shows a vertical, sectional view taken on the line 4—4 of Fig. 3.

Fig. 5 shows a side elevation of a portion of a silo wall illustrating one of the doors therein.

Fig. 6 shows a vertical, sectional view taken on the line 6—6 of Fig. 5.

Fig. 7 shows a sectional view of a portion of the conveyer, the outer end of the conveyer being shown in side elevation.

Fig. 8 shows a sectional view taken on the line 8—8 of Fig. 7.

Fig. 9 shows a detail, sectional view of the adjusting device at the outer end of the endless conveyer; and Fig. 10 shows a detail view partly broken away of part of the endless conveyer structure.

In the accompanying drawings I have used the reference numeral 10 to indicate generally the wall of an ordinary silo structure, which, in the form of my invention shown in the accompanying drawings is illustrated as a circular structure.

The silo 10 preferably rests upon a masonry foundation 11. Below the silo is a passage-way 12 leading from a point below the silo along the ground to a point away from the silo.

Steps 13 may be provided for permitting ingress and egress from the passage 12.

In the center of the lower part of the silo is an upwardly extending circular wall 14, on top of which is an annular plate 15 having a flange 16 inset in the top of the wall.

Resting upon the plate 15 is an annular T-iron 17 extending in inverted position with its central flange extending vertically upwardly.

The hollow cylindrical central member, formed by the wall 14, is provided with a series of segmental cover members 18. Each cover member 18 is triangular in outline as illustrated in Fig. 3, and has on its under surface at its outer edge a curved angle iron 19, having at its outer edge a downwardly extending flange, as illustrated clearly in Fig. 4.

The outer edge of each cover member 18 is beveled as at 20 in Fig. 4, and resting upon said beveled edge is a plate 21, having at its lower end an outwardly and upwardly extending flange 22. Each plate is fastened in position by means of a series of bolts 23 extending through the downwardly extending flange of the angle iron 19.

It will thus be seen that the cover members are given a sort of pivotal or swinging mounting on the upwardly extending flange of the T-iron 17.

For holding the cover members 19 in their raised position, I have provided the following means.

Each cover member 18 is provided with one or more radially elongated slots 24.

Where more than one slot is provided in the same cover member, said slots are arranged with each other as illustrated in Figs. 3 and 4.

Below the slot or slots in each cover member 18 is a plate 25. Extending upwardly from the plate 25 through the slot or slots are bolts 26 on the upper ends of which are washers 27 and above the washers are nuts 28. The bolts may be adjusted radially of the cover members by loosening the nuts for adjusting the position of the plate 25 radially of the cover member.

On each plate 25 is a downwardly extending flange 30 pivoted to a brace 31. Supported on the inside of the wall 14 in suitable position for supporting the lower end of each brace 31 is a shelf 32 such as that illustrated in Fig. 4.

The brace 31 is pivoted to the flange 30 by means of a bolt 33 and there is sufficient play of the parts so that the lower end of the brace may be knocked laterally off the shelf 32 when it is desired to permit one of the cover sections 18 to project downwardly.

Near the bottom of the wall I have provided a series of door openings 34, the upper and lower edges of each door being beveled from the inside downwardly and outwardly as illustrated in Fig. 6.

For each door opening there is provided a door section 35 having its upper and lower edges beveled corresponding with the beveled edges just described.

Mounted on the silo wall on the interior thereof, adjacent to the side of each door opening, is a bracket 36 having a horizontally elongated slot 37 in which is received a rod 38.

The rod 38 is received in a transverse slot or groove 39 in the rear surface of the door section 35, and is held in position by suitable keepers 40 fastened to the inner surface of each door section. The rod 38 is located above center but below the upper end of the door section, as illustrated in Figs. 5 and 6.

On the outside of the silo wall are pivoted buttons or locking members 41 arranged in one position to lock the door sections in place, and in another position to permit the lower ends of the door sections to swing upwardly and outwardly. Each door section is provided on the outside near its lower portion with a handle 43 and near its central portion with a hook 44. When the door section is swung outwardly and upwardly, the hook 44 may be caused to engage a fastening device mounted in the silo wall above the door.

Received in the passage 12 is an endless conveyer comprising a frame 46 which extends from a position below the central cylindrical member 14 upwardly and toward the open end of the passage 12, and thence horizontally away from the silo.

The endless conveyer includes an endless belt 46$^a$ on which are mounted scraper members 47, at the outer edges of which are suitable chains 48 designed to travel over sprockets 49, such as those shown in Fig. 8.

Mounted on the corner members of the frame 49, on the inner sides thereof, are bars or the like 50 which are adjustably held in position by means of U-bolts or the like 51, having on their shanks cross plates 52 which are held in position by means of nuts 53.

At the end of the frame 49 adjacent to the open end of the passage 12 there are mounted in the bars 50, vertically spaced transverse shafts 54 and 55. On said shafts 54 and 55 are sprockets 56 and 49$^a$ adapted to coact with the chains 48.

At the outer end of the frame 49 are similar bars which support a transverse shaft 57 on which are sprockets 58. The shaft 57 is mounted in horizontally elongated slots 59 in the bars 50 at the outer end of the frame 49, and is adjustably held in position by means of screws 60.

At the lower end of the endless conveyer is a shaft 61 on which are sprockets 62 one of which is shown by dotted lines in Fig. 1. The shaft 61 is operated by a chain of gears 63 and a crank 64 or other suitable means may be provided for imparting movement to the endless conveyer.

At the upper end of the frame 46 are upwardly extending rods or shafts 65 which rest slidably on the shaft 55, as illustrated in Fig. 10.

The bars 50 at the rear end of the frame 49 may be vertically adjusted by loosening the ends 53, and then loosening the lower side bars.

By resting the rods or shafts 61 on the shaft 55 it will be seen that raising or lowering of the bars 50 will not be affected, nor will it affect the endless conveyer except to loosen the outer end thereof. Similarly the bars at the outer end of the frame 49 may be raised or lowered and the screws 60 may be adjusted.

The trough 66 is raised and lowered with the outer portion of the endless conveyer, so that the outer end of the endless conveyer with the trough may form a feeding trough for animals and may be located at different heights for the convenience of different animals. The chains 48 of the endless conveyer pass above the sprockets 56 at the rear end of the frame 49, so that the endless conveyer will not sag at any point.

In the practical use of my improved silo structure, the cover members 18 are raised and the braces 31 placed in position, as illustrated, for instance, in Fig. 4.

The doors 35 are closed and the locking devices 41 turned to position for locking the doors in place.

The silo is then filled with ensilage in the ordinary way. When it is desired to use the ensilage from the silo, the locking devices 41 may be moved to position for permitting the handle 43 to be grasped for swinging the door 35 upwardly and outwardly to the position illustrated in Fig. 1.

The hook 44 may be caused to engage the member 45 for holding the door in its raised open position.

Animals can then feed through the door opening in the silo.

The central cylindrical member 14 and the inwardly projecting ends of the door will prevent the ensilage from falling down too rapidly into the space adjacent to the door opening. Part of the ensilage above the door openings can be agitated with a stick or the like causing the ensilage to drop down into the open space from which it has been eaten away. When it is desired to take out ensilage through the passage 12, the lower end of one of the braces 31 may be knocked laterally until it drops off the shelf or support 32, whereupon the corresponding cover member 18 will drop downwardly.

Ordinarily not much ensilage will drop down, but by working the ensilage with a fork or the like it can be dropped down through the lower cover members 18. The ensilage when dropped down may be placed on the endless conveyer and by manipulating the crank 64 the conveyer may be operated for carrying the ensilage upwardly into the trough portion of the conveyer.

The horizontal trough portion of the conveyer may be raised or lowered by raising and lowering the U-bolt supporting members 51. The raising and lowering of the U-bolt members on the frame 49 will cause the rod 65 to slide on the shaft 55 without interfering with the portion of the endless conveyer.

Proper tension may be imposed on the endless conveyer by adjusting the screws 60.

It is, of course, obvious that the endless conveyer may be operated from any suitable source of power.

It may be mentioned also that it is not hard to raise one of the door sections 18 after it has been lowered and some ensilage worked away, for the reason that the ensilage tends to pack and does not drop freely through the opening unless agitated in some way.

That portion of the cover section 16 which projects beyond the pivot line of the cover section, and the member 22 serve to agitate some of the ensilage when a cover section is lowered for causing more of the ensilage to drop downwardly than would otherwise be the case.

The advantage of a device such as that hereinbefore shown may be largely seen from the description.

With a structure of this kind the movable door sections may be opened, and animals may be permitted to feed through the door openings near the bottom of the silo. This will reduce to a very large extent the labor of removing the ensilage.

The peculiar construction of the cover sections is such as to agitate ensilage to a limited extent when the cover sections are dropped, and such agitation causes some ensilage to drop outside the central cylindrical member and some to drop inside.

The ensilage will not drop freely down through the silo and some agitation is necessary.

With this structure the richer ensilage in the center of the silo may be moved through the center of the silo and used for special feed if desired.

The cover sections may be easily replaced in position, for the reason that the ensilage forms an arch over the central portion of the silo, and will not drop freely of its own accord.

The ensilage which drops through the central portion of the silo may be taken out by means of the endless conveyer and used as a feed trough.

By making the cover for the central cylindrical device in sections, the user of the silo is given accurate control of the ensilage.

Any one section of the cover may be readily and easily lowered for removing the ensilage above it. It will be understood that tight joints may be secured in the silo when the lower ensilage is taken away. It will be noted particularly that when the swinging doors are opened their upper portions swing inwardly and accomplish a double purpose.

The ensilage is slightly agitated so that some of the ensilage below the upper portions of the doors will readily drop out or be loosened, so that it is in proper condition for feeding, and the inwardly projecting parts of the doors will furnish a means for preventing the body of the ensilage from sliding downwardly in the silo, until the ensilage just inside the doors is fed away and the upper portion thereof is loosened in any suitable way.

The soft ensilage that may stick above the inwardly projecting ends of said swinging doors may be readily pushed out of the way when it is desired to close the doors.

Another important advantage of the construction hereinbefore set forth, arises from the adjustability of the feeding trough portion of the conveyer whereby the shaft proper may be raised or lowered for conveniently feeding different kinds of stock.

Some changes may be made in the construction and arrangement of the parts of my improved device without departing from the essential features and purposes thereof, and it is my intention to cover by my claims any modified forms of structure or use of mechanical equivalents which may be included within their scope.

I claim as my invention:

1. A silo, comprising a silo wall, a wall spaced from said silo wall extending upwardly in the central part of the silo, cover sections for said inner wall structure, pivoted at their outer edges and having portions adapted to agitate the ensilage when the inner ends of the cover sections are released and dropped downwardly.

2. A silo, comprising a silo wall, a wall spaced from said silo wall extending upwardly in the central part of the silo, cover sections for said inner wall structure, pivoted at their outer edges and having portions adapted to agitate the ensilage when the inner ends of the cover sections are released and dropped downwardly, and means for supporting the inner ends of said cover sections in raised position.

3. A silo, comprising a silo wall, a wall spaced from said silo wall extending upwardly in the central part of the silo, cover sections for said inner wall structure, pivoted at their outer edges and having portions adapted to agitate the ensilage when the inner ends of the cover sections are released and dropped downwardly, means for supporting the inner ends of said cover sections in raised position, said means comprising braces pivoted to said cover sections, and capable of slight lateral movement at their lower ends, and supports for the lower ends of said braces.

4. In a device of the class described, a silo wall, an upwardly extending inwardly spaced wall at the central portion of said wall, a cover device for said inner wall, capable of being opened to permit ensilage to drop downwardly from the central portion of the silo, and an endless conveyer arranged for conveying material out of said passage below said cover, said endless conveyer having a portion outside of said passage adapted to form a feeding trough.

5. In a device of the class described, a silo wall, an upwardly extending inwardly spaced wall at the central portion of said wall, a cover device for said inner wall, capable of being opened to permit ensilage to drop downwardly from the central portion of the silo, an endless conveyer arranged for conveying material out of said passage below said cover, said conveyer having a portion adapted to lift ensilage from a position below said cover, a substantially horizontal portion adapted to serve as a feeding trough.

6. In a device of the class described, a silo wall, an upwardly extending inwardly spaced wall at the central portion of said wall, a cover device for said inner wall, capable of being opened to permit ensilage to drop downwardly from the central portion of the silo, an endless conveyer arranged for conveying material out of said passage below said cover, said conveyer having a portion adapted to lift ensilage from a position below said cover, a substantially horizontal portion adapted to serve as a feeding trough, said feeding trough portion being capable of vertical adjustment.

7. In a device of the class described, a silo wall, an upwardly extending inwardly spaced wall at the central portion of said wall, a cover device for said inner wall, capable of being opened to permit ensilage to drop downwardly from the central portion of the silo, an endless conveyer arranged for conveying material out of said passage below said cover, said conveyer having a portion adapted to lift ensilage from a position below said cover, a substantially horizontal portion adapted to serve as a feeding trough, and means for vertically adjusting said feeding trough portion of the conveyer.

8. In a device of the class described, a silo wall, an upwardly extending inwardly spaced wall at the central portion of said wall, a cover device for said inner wall, capable of being opened to permit ensilage to drop downwardly from the central portion of the silo, an endless conveyer arranged for conveying material out of said passage below said cover, said conveyer having a portion adapted to lift ensilage from a position below said cover, a substantially horizontal portion adapted to serve as a feeding trough, means for controlling said endless conveyer, and means for vertically adjusting the feeding trough portion of said conveyer.

LOREN D. HART.